United States Patent [19]

Moslehi

[11] Patent Number: 5,180,226
[45] Date of Patent: Jan. 19, 1993

[54] METHOD AND APPARATUS FOR PRECISE TEMPERATURE MEASUREMENT

[75] Inventor: Mehrdad M. Moslehi, Dallas, Tex.

[73] Assignee: Texas Instruments Incorporated, Dallas, Tex.

[21] Appl. No.: 785,386

[22] Filed: Oct. 30, 1991

[51] Int. Cl.$^5$ .............................................. G01J 5/06
[52] U.S. Cl. ................................... 374/127; 374/129; 374/133; 250/339
[58] Field of Search ............... 374/121, 123, 126, 127, 374/128, 129, 131, 133; 392/407; 250/338.3, 339

[56] References Cited

U.S. PATENT DOCUMENTS

| | | | |
|---|---|---|---|
| 3,796,099 | 3/1974 | Shimotsuma et al. | 374/126 |
| 4,255,971 | 5/1981 | Rosencwaig | 374/117 X |
| 4,470,710 | 9/1984 | Crane et al. | 374/127 |
| 4,605,314 | 8/1986 | Stenmark | 374/127 |
| 4,647,774 | 3/1987 | Brisk et al. | 374/128 X |
| 4,919,542 | 4/1990 | Nulman et al. | 374/133 X |
| 4,989,991 | 2/1991 | Pecot et al. | 374/133 |
| 5,061,084 | 10/1991 | Thompson et al. | 374/127 |

FOREIGN PATENT DOCUMENTS

| | | | |
|---|---|---|---|
| 56-77728 | 6/1981 | Japan | 374/127 |
| 60-253939 | 12/1985 | Japan | 374/127 |
| 800684 | 1/1981 | U.S.S.R. | 374/127 |

*Primary Examiner*—William A. Cuchlinski, Jr.
*Assistant Examiner*—G. Bradley Bennett
*Attorney, Agent, or Firm*—Stanton C. Braden; Richard L. Donaldson; William E. Hiller

[57] ABSTRACT

In one embodiment, a system for measuring the temperature of a first object, such as wafer 112, in the presence of a second radiating object, such as a heating lamp 118, is disclosed herein. A heating lamp 118 is provided for heating the wafer 112 for device processing. Both the wafer 112 and the lamp 118 emit radiation. A first detector 120 detects radiation emitted by both the wafer 112 and the lamp 118. A second detector 122 which detects radiation from only the heating lamp 118 may also be used. A modulation source 126 is provided for modulating the heater 118 to a selected modulation depth $M_L$ such that the temperature of the lamp 118 varies with the selected AC modulation and the temperature of the wafer 112 remains substantially constant. Also, circuitry is provided for determining the fraction of radiation emitted by the lamp and collected by the first detector 120 (lamp interference signal) based upon the heating lamp modulation and then calculating the precise temperature of the wafer 112. Other systems and methods are also disclosed.

28 Claims, 3 Drawing Sheets

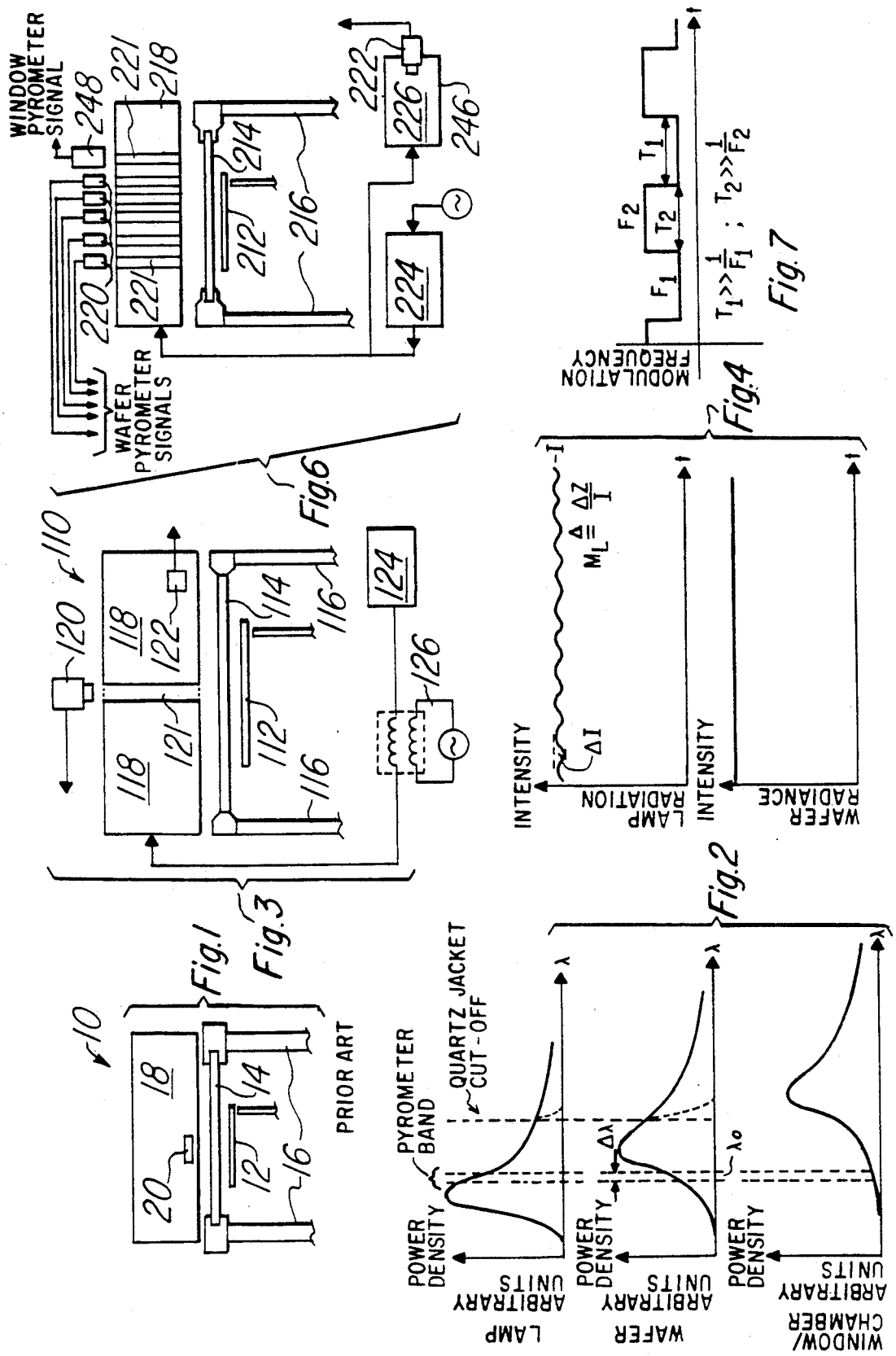

METHOD AND APPARATUS FOR PRECISE TEMPERATURE MEASUREMENT

This invention was made with government support under contract number F33615-88-C-5448 awarded by the United States Air Force. The Government may have certain rights in this invention.

FIELD OF THE INVENTION

This invention generally relates to the field of microelectronics and the fabrication of semiconductor devices and specifically to a method and apparatus for improved pyrometry-based real-time temperature measurement.

BACKGROUND OF THE INVENTION

Precise temperature measurement and control is a critical requirement in advanced semiconductor device fabrication processes such as low-pressure chemical-vapor deposition, epitaxial growth, thermal oxidation, silicide formation, and sinter. One of the many thermal processes of interest is rapid thermal processing (RTP). Monitoring and controlling the wafer temperature and its uniformity in real time is an important part of reliable RTP manufacturing process control.

One method of temperature measurement is to use a thermocouple in contact with the surface which needs to be measured. Another contact measurement technique utilizes a phosphorescent sensor. However, the standard contact measurement methods are not suitable due to possible metallic contamination of the semiconductor material at the point of contact and subsequent diffusion of such contaminants throughout the wafer. In addition, attachment of a thermocouple leads to "shadowing" of the wafer to the incoming radiation, and also a perturbation of the wafer temperature. Moreover, thermocouples degrade in contact with silicon wafers at high temperatures and in reactive (e.g., oxidizing) environments.

Non-contact measurement techniques such as pyrometry have been used extensively for process control in RTP. Typical pyrometry techniques employ narrow-band spectral pyrometers which sample the wafer radiance or black-body radiation over a spectral wavelength band $\Delta\lambda$ centered at a wavelength $\lambda_0$. The wavelength $\lambda_0$ is typically in the infrared spectrum of 1 to 6 microns. Other center wavelengths, however, may also be used.

SUMMARY OF THE INVENTION

The conventional pyrometry techniques used in the lamp-heated RTP systems suffer from various problems and limitations which cause temperature measurement errors. One of these sources of pyrometry errors is that the wafer spectral emissivity usually varies with surface films and temperature. In other words, spectral emissivity is not a fixed/known value. In addition, the optical/vacuum (for example, quartz) window is heated by direct lamp radiation and also wafer black-body radiation and will also induce measurement errors. Further, lamp output radiation and its spectral interference can affect pyrometry measurements. Even still further, surface roughness effects may affect the emissivity due to wafer backside roughness.

Accordingly, improvements which overcome any or all of the problems are presently desirable.

Other objects and advantages will be obvious, and will in part appear hereinafter and will be accomplished by the present invention which provides a method and apparatus for improved pyrometry-based wafer temperature measurement.

A system for measuring the temperature of a first object (e.g., a heated wafer) in the presence of a second object (e.g., a lamp heating source) is disclosed herein. A heater is provided for heating the first and second objects such that the first and second objects emit radiation in a selected band, such as infrared. A first detector detects radiation emitted by the both the first and second objects. A second detector which detects radiation from only the second object may also be used. A modulation source is provided for modulating the heater to a selected modulation depth such that the temperature of the second object varies with the selected modulation and the temperature of the first object remains substantially constant. Also, circuitry is provided for determining the percent of radiation emitted by the second object which was detected in the first detector based upon the modulation and then calculating the temperature of the first object.

In a preferred embodiment, the temperature of a heater wafer is measured in the presence of a lamp heating source. At least one electrical power source is provided to power the lamp source and a dummy lamp. The dummy lamp is not used for wafer heating and its radiation is completely isolated from the wafer. A first detector detects radiation emitted from both the heated wafer and lamp heating source (i.e., the unwanted lamp interference). A second detector which detects radiation from only the dummy lamp may also be used. A power modulation source is provided for modulating the electrical power source to a selected modulation depth such that the output radiation of the dummy lamp varies with the selected AC modulation but the temperature of the heated wafer remains substantially constant, i.e., negligible response to the AC power source modulation. Also circuitry is provided for determining the fraction of total radiation collected by the first detector which is emitted by the lamp heating source and then calculating the temperature of the heated wafer.

An advantage of the invention is that it provides a non-invasive and accurate means to measure wafer temperature during device fabrication without the lamp radiation interference effects. The temperature information may be in turn input to the temperature controller to implement real-time temperature control.

Further, the temperature measurements obtained from the present invention can be made independent of emissivity changes with temperature, surface deposition or etch, and many other factors which vary during fabrication. In addition, error sources such as the heating lamp and radiation emitted from other heated objects in the process chamber, such as the vacuum/optical quartz window for example, may be eliminated.

BRIEF DESCRIPTION OF THE DRAWINGS

The above features of the present invention will be more clearly understood from consideration of the following descriptions in connection with accompanying drawings in which:

FIG. 1 is a conventional process chamber with a pyrometric sensor;

FIG. 2 is a graphical representation of power density emitted as a function of wavelength for selected objects (i.e., heating lamp, wafer and chamber window) in the process chamber;

FIG. 3 is a simplified representation of a chamber for employing the present invention;

FIG. 4 is a graphical representation of radiation intensity as a function of time while a heat source is modulated by an AC signal;

FIG. 6 is a simplified representation of an alternate embodiment chamber for employing the present invention;

FIG. 7 is an illustration of a possible time-division AC modulating multiplexing scheme.

Corresponding numerals and symbols in the different figures refer to corresponding parts unless otherwise indicated.

DETAILED DESCRIPTION OF PREFERRED EMBODIMENTS

Figure 5:
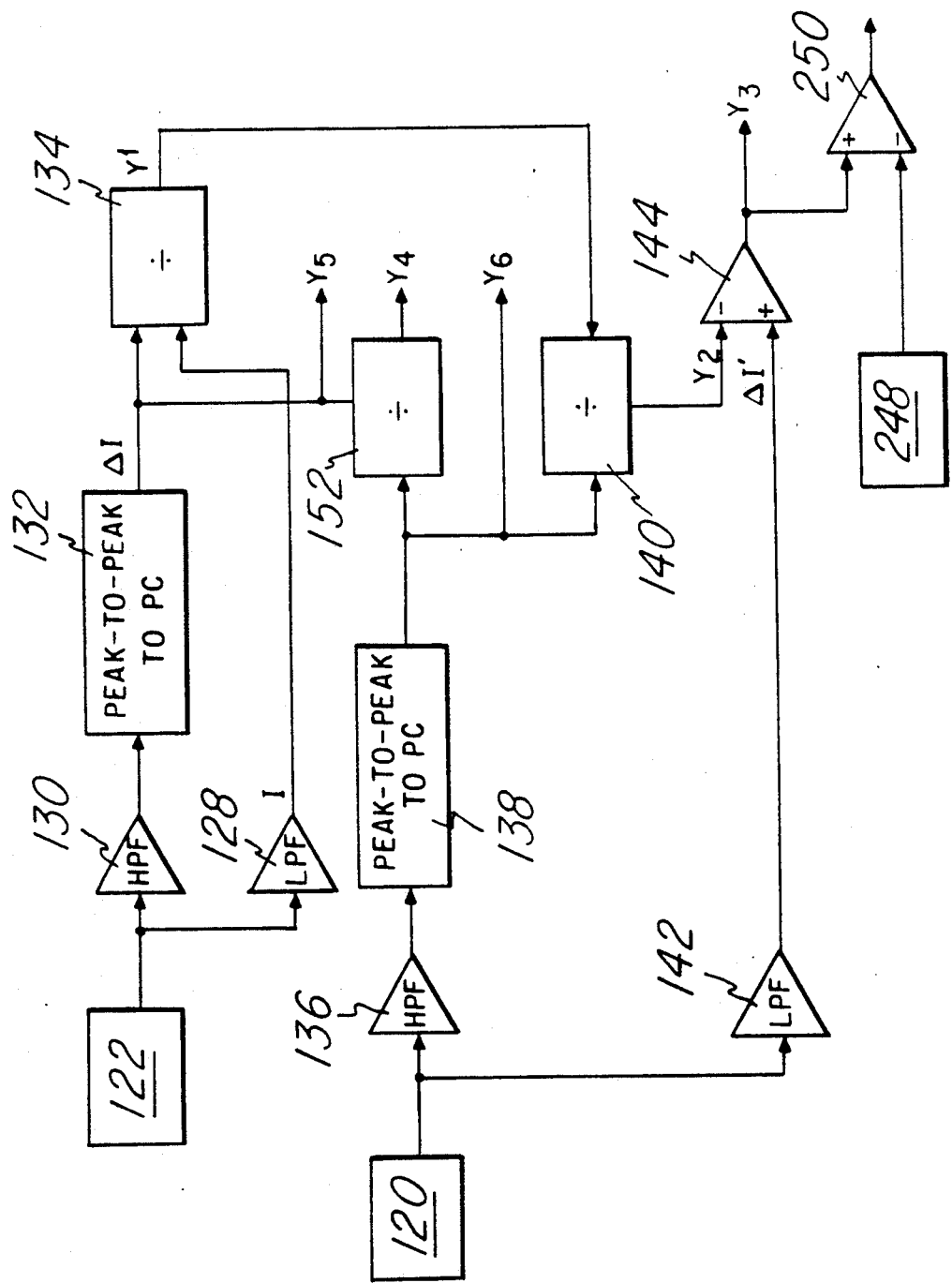
FIG. 5 is a schematic diagram of an exemplary readout circuit to eliminate radiation effects on pyrometry.

The making and use of the presently preferred embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not delimit the scope of the invention.

The following is a description of the apparatus and method of the present invention. The preferred embodiment will be described first followed by a description of modifications. The method of using the invention will then be described.

The single-wafer lamp-heated systems (e.g., rapid thermal processing systems) usually employ tungsten-halogen or plasma arc lamps to heat a semiconductor wafer within the processing chamber from one side (e.g., backside) or from both sides. Some advanced rapid thermal processing (RTP) tools employ one sided wafer heating. An example is the advanced/automated vacuum processor (AVP) of Texas Instruments.

Referring now to FIG. 1, a process chamber 10 (e.g., an RTP reactor) is provided to process a wafer 12. Typically, the wafer 12 may be processed face down, i.e., heated from the backside through the window 14. The process chamber includes an optical window 14, made of quartz for example, and chamber collar 16. The processing typically, but not necessarily, takes place under low pressure as well as atmospheric pressure conditions. In addition, the processing typically, but not necessarily, is performed on a single wafer at a time.

Outside the process chamber, there is a heating lamp 18 which effects the temperature of wafer 12 via photon-assisted energy. The heating lamp module may be made of a combination of tungsten-halogen heating lamps or an arc lamp or any other optical sources for heating the wafer. Illustrated adjacent to the heating lamp is a pyrometer 20 to measure the temperature of wafer 12 by measuring the radiance emitted from the wafer 12 backside.

Pyrometers, such as pyrometer 20, can view the wafer either on the side opposite the lamp assembly or on the same side of the lamp assembly. The latter is typically a preferred method due to reduced wafer pattern and also lamp interference effects. Usually, the pyrometer 20 operates over a narrow spectral band centered at a selected wavelength in the infrared band.

Employing a pyrometer on the same side of the wafer as the lamp allows wafer temperature measurements via a customized light pipe (not shown) with some undesirable interference effects due to the heating lamp radiation. The lamp interference effect on pyrometry is caused by the spectral portion of the lamp output radiation energy which overlaps the spectral passband of the pyrometer. No direct lamp radiation enters the pyrometer sensor when the pyrometer is placed on the same side as a lamp assembly. However, a fraction of the heating lamp radiation energy is reflected by the wafer backside and the quartz surfaces (as well as other chamber walls) and is collected by the pyrometer. The lamp interference effect may be worse if the pyrometer is placed at the opposite side of the wafer in relation to the lamp assembly, i.e., viewing the front-side of the wafer.

In order to further understand the lamp interference as well as the window heating problems, consideration of the spectral radiation energy outputs of heating lamps, the heated wafer, and the heated chamber and window should be made. It should be noted that quartz starts to become opaque at wavelengths greater than about 3.5 microns. The optical/vacuum quartz window itself may be heated to a few hundred degrees C. by wafer radiation and direct heating lamp radiation.

As illustrated in FIG. 2, some portions of the tungsten-halogen lamp spectrum and the heated quartz radiation may fall within the pyrometry measurement band, resulting in measurement errors. Of course, it is possible to choose the pyrometer center wavelength beyond about 3.5 microns (for example, at 5 microns) where the tungsten-halogen lamp energy is cut off due to the lamp quartz jacket cut-off. However, this would require an infrared viewport other than quartz in order to allow wafer radiation transport to the pyrometer. The choice of longer wavelengths ($\lambda > 3.5\mu$) for pyrometry has two possible drawbacks: 1) more complex optical/vacuum window design to allow the larger wavelength infrared transmission, and 2) more sensitivity to heated window radiation because most of the energy density for the window radiation is at the longer infrared wavelengths.

Therefore, there is a need for a technique which can eliminate the interference effects of lamp radiation and heated chamber components on pyrometry measurements. Such a technique would result in a significant improvement in the wafer temperature measurement accuracy and repeatability using pyrometry with center wavelength below the cut-off wavelength of quartz. This method would allow the use of wavelengths less than 3.5 microns and a quartz viewpoint without having to worry about the lamp and heated window interference effects.

In one embodiment, this invention proposes a technique to identify and isolate the interference effects of the heating lamp radiation from the wafer radiance in the spectral band of the pyrometer. The same technique can be extended to identify and separate the interference effects of heated quartz (for example, heated optical/vacuum quartz window as well as heated lamp jacket) from the wafer radiance in the response band of the pyrometer. In one aspect, the invention is based on the fact that the small-signal thermal mass of the heated lamp filament is much smaller than the small-signal thermal mass of the wafer and, in turn, the small-signal thermal mass of the wafer is much less than the small-signal thermal mass of the heated quartz parts (window and lamp jacket) and any other heated chamber surfaces.

Referring now to FIG. 3, a processing chamber 110 (e.g., a rapid thermal processing reactor) may be used to perform the present invention. The system includes an optical window 114, typically made of quartz or sapphire for example, and chamber collar walls 116.

A heating lamp 118 may be a tungsten halogen heating lamp, an arc lamp, or any other optical heating apparatus which can affect the temperature of the wafer. Although referred throughout this patent as a lamp, a non-lamp infrared heating apparatus may also be used. In general, the method of heating the system is not important. The lamp 118 typically heats the wafer 112 to temperatures from below 300° C. to 1200° C.

A first pyrometer 120 is provided to measure the emitted radiance from the wafer 112 in a selected spectral band. As discussed above, this first pyrometer 120 will also collect some fraction of radiance from the heating lamp 118 as well as the window 114 and possibly the chamber walls 116. The pyrometer 120 is optically visible to the wafer through a transmissive light pipe 121 which may be a hollow pipe or an optical fiber channel, as two examples. The pyrometer 120 itself employs a suitable detector (e.g., lead selenide, fast thermopile, or other) and a suitable filter window.

Also provided is a second pyrometer 122 with characteristics (e.g., response band) nearly identical to those of the first detector 120 which will only measure radiation from the heating lamp 118 in the same spectral band as the first pyrometer. In other words, the second pyrometer 122 is fully isolated from the wafer 112. The lamp assembly 118 is powered by using at least one power supply 124. Connected internally (not shown) or in line (illustrated in FIG. 3) with the power supply 124 is an AC small-signal modulator 126. In one example, modulator 126 may modulate the current with a sinusoidal modulation between about 1 and 100 Hz. The ratio of the AC modulation to the DC portion may typically be less than 10%. Both the frequency and the magnitude of modulation can be controlled by the process control circuitry.

The small-signal AC modulation of the lamp power supply (or power supplies if multi-zone heating is used) can be performed by either transformer-assisted voltage coupling or by direct modulation of the triac trigger phase angle in the power control circuitry. The modulation depth, i.e., the ratio of the amplitude of the AC portion of the signal to the amplitude of the DC portion of the signal, of the lamp radiation should be small enough (e.g., less than 10%) so that the wafer temperature disturbance is kept negligible.

In general, a small-signal AC modulation of the lamp power can be performed at a suitable frequency, for example at greater than 10 Hz. The preferred range is between 10 and 30 Hz. The modulation frequency is chosen to be large enough so that the wafer 112 radiance is not modulated (while the lamp 118 radiation is modulated due to the much smaller small-signal thermal mass of the lamp filaments.

Typically, a small modulation depth is used. This AC modulation of the lamp output will change or modulate the lamp intensity without significantly shifting its radiation spectrum. Since the small-signal thermal mass of the wafer is much larger than that of the lamp filament, it is possible to perform a small-signal modulation of the lamp power at a suitable frequency and, as a result, the optical energy without modulating the wafer temperature or the wafer output radiance.

This invention employs small signal modulation of the lamp power at a frequency small enough for the lamp filament as well as the pyrometry detector to respond and large enough to prevent modulation of the wafer radiance (or temperature). This feature is illustrated in FIG. 4 which shows the lamp radiation intensity is modulated but the wafer radiance remains substantially unaffected by the AC modulation of the lamp power supply.

A second detector 122 (substantially identical to the first detector 120) is used which measures the heating lamp 118 spectral power in the same band as the pyrometer 120 band. The detector 122 may use an appropriate light pipe (not shown), for example, fluoride, chalcogenide, silver halide, sapphire, in order to collect a portion of the radiation emitted by the heating lamp 118 without collecting any portion of the wafer 112 radiance. The small-signal modulation frequency is chosen or optimized depending upon the heating lamp 118 and the wafer 112 thermal mass values. Suitable modulation frequencies may be selected in the range of 10 to 30 Hz or higher. Various suitable detector materials may be used for the two pyrometers. For fast pyrometry up to 5 to 6 microns, lead selenide (PbSe) is a good choice. Thermopile detectors may also be used; however, their slow response limits the maximum AC modulation frequency to less than 10 Hz. The modulation depth is chosen based on a dynamic range of the detector and may be about 0.1% to 10%. More sensitive noise-free detectors allow smaller modulation depth.

In one embodiment, the present invention may be used as follows. Referring now to FIG. 5, a sample or portion of the spectral power of the lamp radiation is measured by the second pyrometer 122. The spectral power includes an AC component $\Delta I$ (for reference, $\Delta I$ is shown as the peak-to-peak AC signal) and the DC component I (illustrated in FIG. 4). The second detector 122 operates in the same spectral band $\Delta\lambda$, and therefore the same center wavelength, as the first detector. As an example, $\lambda_0$ may be 3.3 $\mu$m and $\Delta\lambda$ may be 0.4 $\mu$m.

The detector 122 output signal is provided to a low-pass filter 128 which outputs the DC component I. The detector 122 output is also provided to a high-pass filter 130 and a peak-to-peak to DC converter 132 which in turn outputs the AC portion of the lamp intensity $\Delta I$.

The lamp radiation modulation depth $M_L$ is determined by dividing the peak-to-peak value of the AC component $\Delta I$ of the second detector 122 by its DC component I in divider 134.

At the same time, the AC component $\Delta I'$ of the first detector 120 is determined from high-pass filter 136 and peak-to-peak to DC converter 138. The AC component $\Delta I'$ of the first detector 120 is then divided by the measured lamp modulation depth $M_L$ in dividing circuit 140. The output $Y_2$ of the divider is the amount of DC lamp interference, i.e., the main source of measurement error in the wafer temperature sensor or first detector 120.

It should be noted that the modulation depth $M_L$ does not need to be measured directly as illustrated in FIG. 3 if it is already known (for instance, in the modulation device). If the modulation depth is known, this known value may be used for input $M_L$ or $Y_1$ into divider 140. In this case, the second detector 122 is not necessary. However, the use of the second detector and its associated circuitry for real-time measurement of the modulation depth is preferred for robust operation.

The lamp interference effect or $Y_2$ may be subtracted from the DC component $I'$ from the first pyrometer (obtained from low-pass filter 142) in difference or differential amplifier circuity 144. The output $Y_3$ of the difference circuit 144 is based on the wafer temperature and substantially all lamp interference portion has been eliminated.

This technique also provides real-time data on spectral wafer reflectance (or emissivity) in the spectral band of the pyrometer. This information can be used for real time correction/compensation of wafer temperature measurement using pyrometry. The spectral reflectance is essentially proportional to the ratio of the AC signal level $\Delta I'$ detected by the wafer pyrometer to the AC signal level $\Delta I$ detected by the lamp detector. The emissivity is proportional to the output of divider 252, labeled as $Y_4$ in FIG. 5. $Y_4$ is a measure of the wafer spectral emissivity at the same center wavelength as the pyrometers.

The block diagram in FIG. 5 shows an exemplary approach by which the true wafer temperature is extracted eliminating the lamp interference effects in real time. This invention operates on the fact that the same or equal fractions of the AC modulation signal and DC component of the lamp radiation (in the spectral band $\Delta\lambda$ centered at $\lambda_0$) enter the lamp detector. The modulation depth $M_L$ measured by the lamp detector is used as a signature to identify the amount of lamp radiation which enters the pyrometer sensor (first detector 120) at $\lambda_0$ in the spectral band $\Delta\lambda$. The AC signal detected is scaled or divided by the lamp modulation depth to determine the actual DC lamp interference signal which interferes with the wafer temperature sensor.

It should be noted that it is important that the light guide or fiber for the lamp detector 122 be properly set up such that it does not collect any fragment of the wafer 112 radiance. This can be easily done by proper placement of the fiber end (possibly along with the focusing lens) with respect to lamp assembly 118.

Another possible way to monitor the lamp modulation is to use a dummy tungsten-halogen lamp 226 (of the same type as those used in the lamp assembly) in a separate dummy lamp box location 246 outside the lamp assembly 218 and process reactor 216. This embodiment is illustrated in FIG. 6. This dummy lamp 226 is powered by the same power supply 224 as the main lamp assembly 218. The lamp detector 222 is used to monitor the outside dummy lamp 226 away from the wafer radiance effects.

Several other modifications are illustrated in FIG. 6. Any or all of the variations may be incorporated. In the embodiment illustrated here, several wafer detectors 220 are used. The advantage of several detectors 220 is multi-point pyrometry for real-time wafer temperature uniformity control. Moreover, with a multi-zone heating lamp assembly, multiple dummy lamps may be used along with multiple lamp detectors. The dummy lamps are powered by various zone power supplies (e.g., four dummy lamps with a four zone heating lamp).

The lamp spectral radiation may be monitored either directly (by the appropriate light pipe) within the lamp assembly or by monitoring a separate dummy tungsten-halogen lamp powered by the same lamp power supply. In a multi-zone lamp assembly, multiple lamp signals may be obtained by using a separate tungsten halogen lamp (dummy lamp) for each zone. Each dummy lamp is powered and modulated by one of the zone power supplies. The lamp detectors monitor the same spectral bands as the wafer temperature sensors.

Also shown is a window/chamber pyrometer 248. An easy method to eliminate the error induced by the heated window 214 and walls 216 is to employ a separate pyrometer 248 which operates at a long infrared wavelength beyond the transmission band of the quartz window 214, for example 8 to 14 microns which is greater than 3.5 microns, as shown for example in FIG. 2). This long infrared pyrometer 248 provides effective window radiance signal which can then be translated to a window-induced spectral radiance interference signal in the wafer temperature sensor band.

The effective window radiance may be subtracted from the total spectral radiance based on a pre-specified algorithm. The output of subtractor 250 will also have the window radiance error effect eliminated (see FIG. 5 for example).

Another method may be employed to cancel out the effects of the heated window 214 and the heated jackets of the heating lamps. This can be done by time-division multiplexing and dual-frequency modulation of the lamp output energy. In general, lamp power to modulation (small-signal) can be done at a frequency $f_1$ for a period $T_1$ and a frequency $f_2$ for a period $T_2$ as illustrated in FIG. 7.

The modulation frequency $f_2$ is large enough such that the wafer radiance or temperature is not modulated at all by the frequency $f_2$ but the lamp output radiation is modulated (due to the fact the wafer has a larger thermal mass compared to the lamp filament). This is the case illustrated in FIG. 4. On the other hand, the frequency $f_1$ is small enough such that the wafer does respond to the lamp output modulation but the heated chamber window and walls do not. For example, the frequency $f_2$ may be between about 10 and 1000 Hz and the frequency $f_1$ may be less than 5 Hz. During each time period $T_2$, the circuit shown in FIG. 5 will extract the interference contribution of the lamp radiation to the pyrometer reading. During this period, the lamp modulation at frequency $f_2$ does not cause any modulation in the radiances of the heated wafer and the heated quartz window (and heated quartz jackets of the lamps). For time periods $T_1$ and $T_2$ may for example be a few seconds. For example, with $f_1=4$ Hz and $f_2=25$ Hz, $T_1$ and $T_2$ may be selected to be 2 seconds and 1 second respectively.

During each $T_1$, the low-frequency lamp modulation causes modulation of the lamp output energy as well as the wafer radiance. However, the radiance of the heated quartz window is not modulated due to the much larger thermal mass of the quartz window (and lamp jackets).

The amount of lamp radiation interference effect is determined and quantified during the $T_2$ periods. As a result, it can be subtracted from the combined effects of the lamp radiation and wafer radiances during the $T_1$ and $T_2$ periods in order to determine and subtract the extent of lamp interference effect on the pyrometer signal. Frequency $f_1$ is low enough such that the lamp signal modulation and the wafer signal modulation are essentially in phase (although this is not an essential requirement). During the time periods $T_1$, the system of this invention determines the amount of measurement error caused by heated quartz parts.

Figure 8:
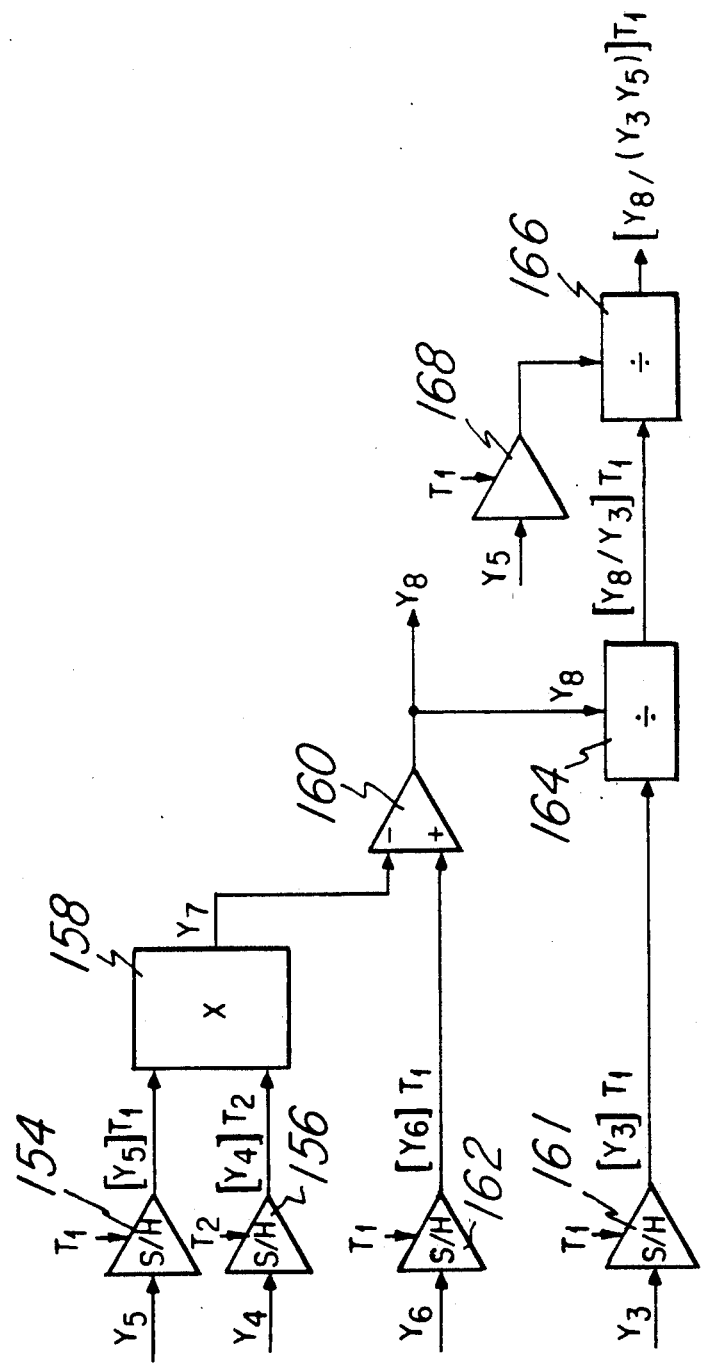
FIG. 8 is a schematic diagram of additional signal processing readout circuitry which may be used to eliminate heated window interference effects.

Referring now to FIG. 8 along with FIG. 5, the AC portion from the lamp detector $\Delta I$ or $Y_5$ is applied to sample-and-hold circuit 154 which is sampled during time periods $T_1$. Likewise, the output $Y_4$ of divider 152 is applied to the sample-and-hold circuit 156 and sampled during time periods $T_2$. The sample-and-hold circuits may find the peak value or an average value. The outputs of $[Y_5]_{T1}$ and $[Y_4]_{T2}$ are multiplied and the product is referred to as $Y_7$.

The value of $Y_7$ is subtracted (subtractor 160) from the AC portion of the wafer detector $Y_6$ which has been sampled (sample-and-hold circuit 162) during time period $T_1$ to get output $Y_8$. The output $Y_8$ is then divided into the wafer radiance $[Y_3]_{T1}$ (sampled in sample and hold circuit 161 during time $T_1$) in divider 164. This output $[Y_8/Y_3]_{T1}$ is divided (in divider 166) by the AC portion of the lamp detector $[Y_5]_{T1}$ (sampled in sample and hold circuit 168 during time $T_1$ to obtain output $[Y_8/(Y_3Y_5)]_{T1}$. This value is an alternate method for obtaining the contributions of the heated chamber window and walls to the wafer pyrometer reading and may be used as an input to the difference circuit 250 of FIG. 5.

In other words, an alternate method to eliminate the spectral interference overlap signal due to the heated window is to monitor $[Y_8/(Y_3Y_5)]_{T1}$ during a wafer processing cycle. Any drift or variation in $[Y_8/(Y_3Y_5)]_{T1}$ with time (as seen by a change of this signal) is directly related to the heating of the high thermal mass window and chamber walls. This can easily be translated into a slowly increasing window radiance signal which can be quantified and subtracted from the pyrometer radiance in real time as illustrated in FIG. 8.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system for measuring the temperature of a first heated object in the presence of at least one second radiating object, comprising:
    a power source for energizing said second object and heating said first object such that said first and second objects emit radiation with partially overlapping spectral bands;
    a first detector for detecting radiation power emitted by said first and second objects;
    a modulation source for modulating said power source to a first selected modulation depth and frequency such that the emitted radiation of of said second object varies with said selected modulation depth and frequency and the temperature of said first object remains substantially unmodulated; and
    circuitry coupled to said first detector for determining the fraction of radiation emitted by said second object and collected as interference effect in said first detector based upon said modulation depth and determining the temperature of said first object without the interference effect of said second object.

2. The system of claim 1 and further comprising a second detector for detecting at least a portion of radiation emitted by said second object, said second detector isolated from said first object; and circuitry coupled to said second detector for determining said modulation depth.

3. The system of claim 2 wherein said first and second detectors operate in the same spectral bands and center wavelengths.

4. The system of claim 1 wherein said first object is a semiconductor wafer and said second object is a heating source.

5. The system of claim 1 wherein said frequency is between about 10 and 100 Hz.

6. The system of claim 1 wherein said partially overlapping spectral bands are in the infrared band.

7. The system of claim 6 wherein said partially overlapping spectral bands have a center wavelength less than about 3.5 microns.

8. The system of claim 1 wherein the modulation depth of said modulation is in the range of about 0.1% to 10%.

9. The system of claim 1 wherein said power source comprises at least one tungsten halogen heating lamp.

10. The system of claim 1 wherein said first detector is lead selenide detector.

11. The system of claim 1 and further comprising a third detector for detecting radiation in a second selected spectral band different than said partially overlapping spectral bands and circuitry for subtracing errors in the temperature of said first object determined from said third detector.

12. The system of claim 1 and further comprising a third heated object which introduces an interference effect, wherein the interference effect of said third heated object is determined by modulating said power source to a second modulation frequency such that the emitted radiation of said first and second objects vary with said second modulation frequency and the radiation emitted by said third object remains substantially unmodulated.

13. The system of claim 12 wherein said modulation source switches between said first selected modulation frequency and said second modulation frequency.

14. The system of claim 13 and further comprising circuitry for determining the temperature of said first object without the interference effect of said third object.

15. A method for determining the temperature of a semiconductor wafer comprising the steps of:
    heating said wafer with a modulated heat source such that the temperature of at least one error source is modulated with a selected modulation depth and the temperature of said wafer is substantially unmodulated;
    detecting the radiance of said wafer along with the radiance of said at least one error source; and
    determining the temperature of said wafer by calculating the contribution of said at least one error source based upon said modulation depth.

16. The method of claim 15 wherein said error source is a heating lamp.

17. The method of claim 15 and further comprising the step of detecting the radiance of said at least one error source and calculating said modulation depth therefrom prior to determining the temperature of said wafer.

18. A method for measuring the temperature of a first heated object in the presence of a second radiating object, comprising the steps of:

heating said first and second objects with a power source such that said first and second objects emit radiation with partially overlapping spectral bands;

detecting said radiation emitted by said first and second objects;

modulating said power source to a selected modulation depth and frequency such that the temperature of said second object varies with said selected modulation depth and frequency and the temperature of said first object remains substantially unmodulated;

determining the fraction of radiation emitted by said second object which was detected based upon said modulation depth and frequency; and calculating the temperature of said first object.

19. The method of claim 18 further comprising the step of detecting radiation emitted by said second object calculating said modulation depth therefrom.

20. The method of claim 18 wherein said first object is a semiconductor wafer and said second object is a heating lamp.

21. The method of claim 18 wherein said frequency is between about 10 and 100 Hz.

22. The method of claim 18 wherein said modulation depth is between about 0.1% and 10%.

23. A system for measuring the emissivity of a first object in the presence of a second object, comprising:

a power source for energizing said first and second objects such that said first and second objects emit radiation in a selected spectral band;

a first detector for detecting radiation power emitted by said first and second objects, said radiation power depending upon the temperature of said first and second objects;

a second detector for detecting said radiation emitted by said second object, said second detector isolated from the radiation emitted by said first object;

a modulation source for modulating said heater to a selected modulation depth and frequency such that the temperature of said second object varies with said selected modulation depth and frequency and has an AC component and a DC component and a modulation depth and the temperature of said first object remains substantially unmodulated;

circuitry to determine the magnitude of the AC component of the radiation detected in said first detector;

circuitry to determine the magnitude the AC component of the radiation detected in said second detector; and circuitry to find the ratio of the AC component of the radiation detected in said first detector and the AC component of the radiation detected in said second detector.

24. The system of claim 23 and further comprising a second detector isolated from said first object for detecting radiation emitted by said second object, and circuitry for calculating said modulation depth.

25. The system of claim 23 wherein said first object is a semiconductor wafer and said second object is a heating lamp.

26. The system of claim 23 wherein said frequency is between about 10 and 100 Hz.

27. The system of claim 23 wherein said selected band comprises radiation with a center wavelength less than about 3.5 microns.

28. The system of claim 23 wherein said modulation depth is between about 0.1% and 10%.

* * * * *